Nov. 19, 1940.　　　W. H. BARLOW　　　2,222,493
JAW UNIT FOR ELECTRIC CONNECTORS
Filed Dec. 14, 1938　　　2 Sheets-Sheet 1
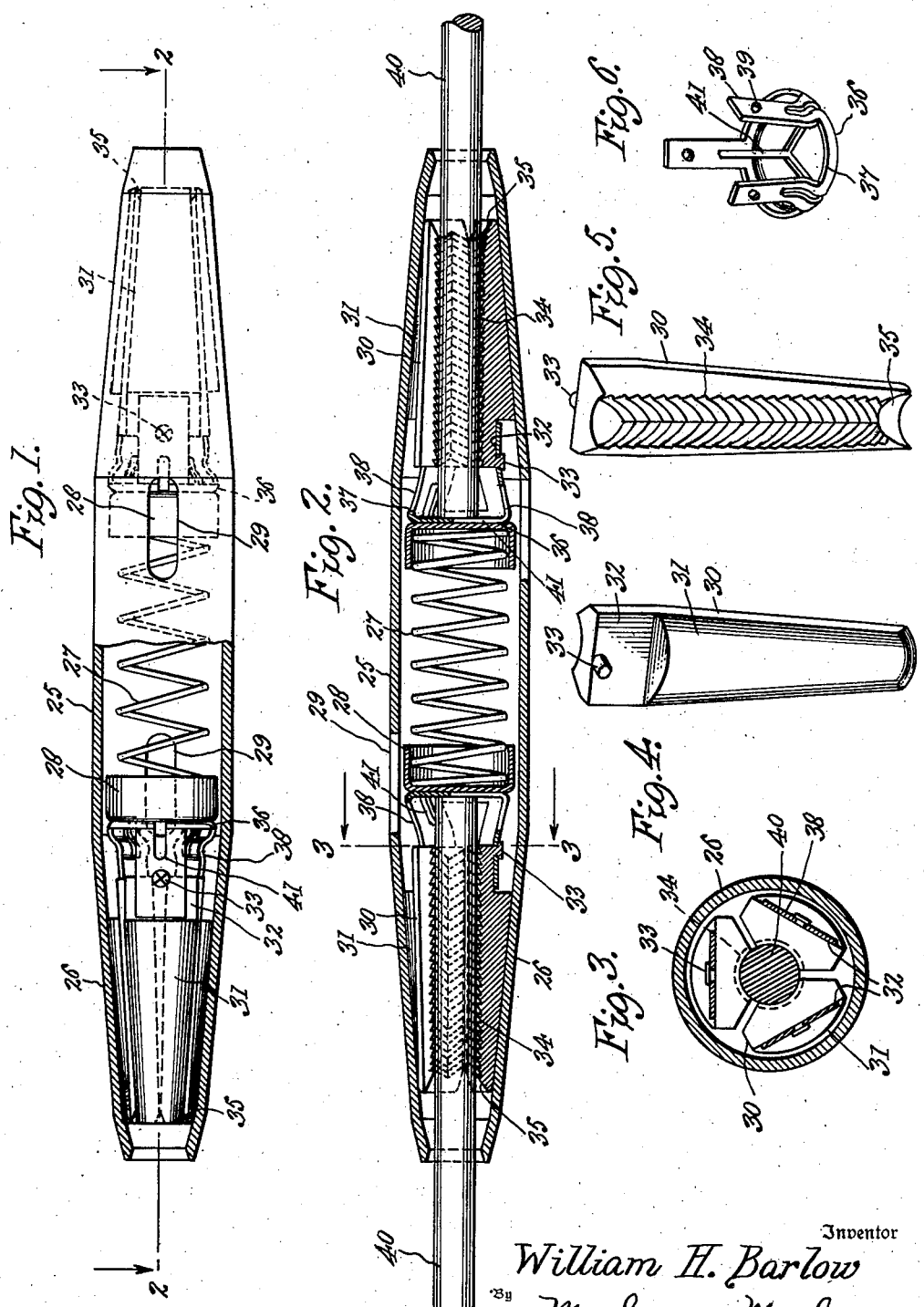
Inventor
William H. Barlow
By Mawhinney & Mawhinney
Attorneys

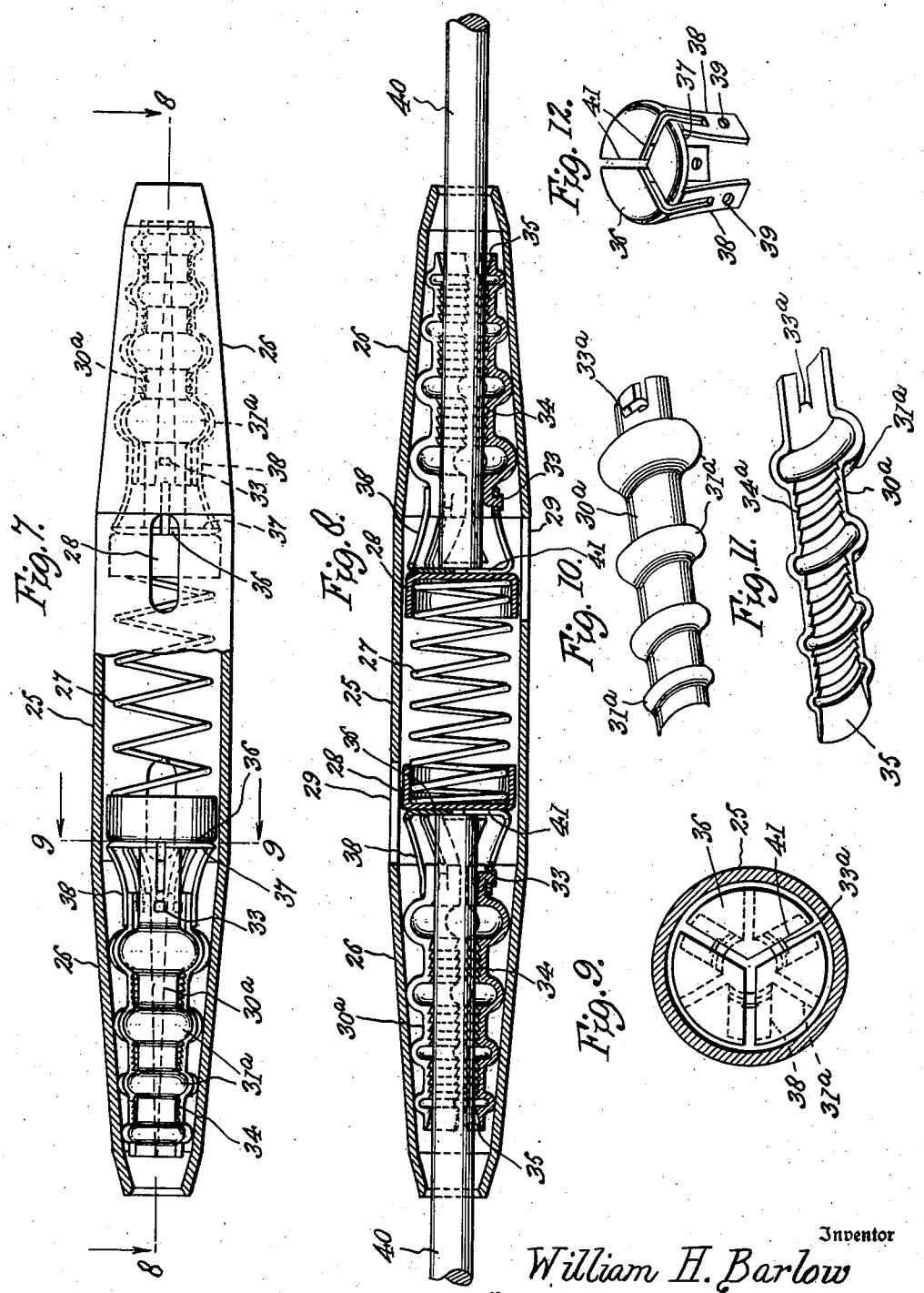

Patented Nov. 19, 1940

2,222,493

UNITED STATES PATENT OFFICE 2,222,493

JAW UNIT FOR ELECTRIC CONNECTORS

William H. Barlow, Waterbury, Conn., assignor to Scovill Manufacturing Company, Waterbury, Conn., a corporation of Connecticut Application December 14, 1938, Serial No. 245,753

6 Claims. (Cl. 24—126)

The present invention relates to wire, cable and the like connectors, and is an improvement on my prior connector set forth in Patent No. 2,128,112 granted to me on August 23, 1938.

This invention relates more particularly to the jaw unit comprising the spider head and the wire gripping jaws carried thereby. In all prior constructions the spider head has been too stiff or rigid to admit the desired settling of the jaws against the inner tapering wall of the casing and about the wire or cable. This disadvantage is particularly emphasized because of the varying angle that occurs in the inside wall of the tapered end of the casing. The present known spider head is not sufficiently limber or flexible to allow the jaws to readily assume the angle inside the casing, thus limiting the effective gripping of the jaws on the cable. In the process of manufacture the exact angle of the inside wall of the tapered end of the casing cannot be controlled. The tapered end is formed by a swagging operation and, while the formation of the outside surface can be controlled, the angle of the inside wall varies due to more metal accumulating adjacent the tapering end of the casing.

It is an object of this invention to provide a spider head for holding the jaws in their relative positions but which is resilient or flexible to such an extent as to allow the jaws to independently assume their best positions within the casing; circumferentially, radially and longitudinally, corresponding to the angle and any irregularities of the inner wall of the casing and the exterior contour of the wire or cable.

Another object of the invention is to provide a head for the jaws to which the latter may be secured for handling the jaws and head as a unit, and without the necessity of manually holding the jaws on the head during assembling of the jaw unit in the casing.

The invention aims to avoid the rigidity found in such structures as are exemplified in the Dibner Patent No. 2,118,266. The structure of this patent has spring arms secured to the jaws so that the jaws are connected by spring hinges to the spider head. There is no free movement permitted of the jaws toward and from one another at their inner ends either radially or circumferentially, and the arms of the spider are broad and edgewise rigid so that there lacks the light spring connection between adjacent jaws throughout the group or series of jaws which admits the individual settling of the jaws between the wire and the inner tapering wall of the casing.

A further object of the invention is to provide a jaw constructed of sheet metal stamped into shape, and wherein the wire engaging teeth may be made sharper than those in the usual forged jaw, and wherein the alloy and the temper of the jaw material may be better selected and controlled to provide teeth of considerably greater strength and sharpness to grip with greater tenacity about the wire or cable.

Another object of the invention is to provide a jaw with spaced and rounded bearing surfaces for engaging the inner wall of the tapering end of the casing to reduce frictional contact and admit the easy sliding and settling of the jaws therein when gripping a wire, and also to admit contracting pressure at spaced points lengthwise of the jaw for insuring gripping of the wire throughout a substantial length thereof.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a side elevation, with one end in section, of a wire or cable connector having a jaw unit constructed according to the present invention and in normal position ready to receive the wire or cable.

Figure 2 is a longitudinal section taken through the same having wire ends secured therein.

Figure 3 is an enlarged transverse section taken through the same on the line 3—3 of Figure 2.

Figure 4 is a detail perspective view of the outer side of one of the wire gripping jaws.

Figure 5 is a similar view of the inner side of the jaw.

Figure 6 is a detail perspective view of the spider head showing the slots extending from the crown or disc into the jaw carrying arms.

Figure 7 is a side elevation, partly in section, of a wire connector, showing a novel modified form of wire gripping jaw for use with the spider head of this invention, the connector parts being in position for receiving the ends of a wire or cable.

Figure 8 is a longitudinal section taken through the same, showing wire ends secured in the connector.

Figure 9 is a transverse section, enlarged, through the connector taken on the line 9—9 of Figure 7.

Figure 10 is a detail perspective view of the outer side of one of the modified jaws.

Figure 11 is a similar view of the inner side thereof, and

Figure 12 is a detail perspective view of the spider head, showing the outer end or crown thereof.

Referring now to the drawings, and first to Figures 1 to 6, the connector illustrated is of the double ended type adapted to receive and grip in its opposite ends the extremities of wire, cables, rods or the like.

The connector comprises a cylindrical casing 25 which has its opposite ends tapered by swagging or the like to provide relatively long gradually tapering end portions 26 to the casing, and these end portions 26 terminate in openings of suitable size to receive the wire or the cable therein by advancing the wire or cable lengthwise into the casing.

The casing 25 is provided at its cylindrical portion with an expanding spring 27 provided with opposite end caps 28 normally urged from each other by the spring. The casing 25 is provided near the opposite ends of its cylindrical portion with longitudinal slots 29 for the introduction of a suitable tool or implement to engage the caps 28 for retracting the same when it is desired to release spring pressure upon the gripping units disposed in the opposite tapering portions 26 of the casing.

Each wire or cable gripping unit comprises a group of jaws 30. As shown particularly in Figures 4 and 5, each jaw may be a forging which tapers toward its outer end and is provided with an outer cylindrical surface 31 adapted to engage, throughout its extent against the inner wall of the tapering end 26 of the casing. The inner end of the jaw 30 is provided with an outer flat face 32 providing a seat and swaged or drawn from the jaw is a stud or rivet 33 which rises from the seat 32. The inner side of the jaw, as shown in Figure 5, is of transverse concave form having gripping teeth or serrations 34 adapted to grip the wire or cable when the jaw 30 is compressed or contracted thereagainst. The outer end of the jaw 30, at its inner wall, is bevelled to provide a cam face 35 against which the extremity of the wire or cable is adapted to bear for retracting the jaw into the larger end of the tapering portion 26 of the casing and for spreading the jaw sufficiently to admit of the introduction of the wire or cable into the casing between the jaws.

The jaws 30 are shown in the present illustration as used in a group or series of three and are resiliently connected together by a spider head shown in Figure 6. The spider head comprises a crown or disc 36 of sufficient diameter to loosely and slidably fit in the casing 26 and which may be reinforced by a rim flange 37 turned from the edge of the disc 37 in one direction thereabout, and this disc or crown carries a plurality of arms or fingers 38, one for each jaw 30 and shown as three in number in the present instance. Each finger 38 has an opening 39 therethrough for the reception of the stud or rivet 33 and each finger 38 is flat and adapted to be secured against the flat face or seat 32 of the jaw 30 to hold the jaw to the spider head. It will be noted particularly from Figures 1, 2 and 6 that the fingers are bent or offset inwardly toward one another and that the jaws 30 are secured to the outer end portions of the fingers only so that the fingers are free to flex or bend with the movements of the jaws 30 as the latter settle between the inner wall of the tapering end 26 of the casing and about the wire or cable 40 which is disposed between the jaws.

In order to render more flexible and resilient the connection between adjacent jaws 30 in the group and to impart a more or less independent movement of the jaws 30 in practically all directions, the crown or disc 36 of the spider head is provided with radial slots 41 which intersect at the central portion of the crown 36 and extend radially through the reinforcing rim 37 and lengthwise into the arms or fingers 38. Thus, the spider head is divided into segments or sections which are independent of one another except through their connections at the outer ends of the arms or fingers 38. The segments of the head at opposite ends are connected to the independent spring portions of the arms so that these arms are relatively flexible or yieldable and are permitted to swing yieldingly in an edgewise direction and are also permitted, incident to their slotted formation, to bend or yield radially and to a slight extent longitudinally. Thus, the spider head yieldingly and resiliently holds the jaws 30 in unit formation for easy assembly and operation and at the same time admits of the substantially independent longitudinal, circumferential, radial and tilting movements of the jaws as they are adjusted automatically about the wire 40 and against the inner wall of the tapering end 26 of the casing. Of course the spring 27, through its adjacent end cap 28, normally exerts an outward pressure upon the crown or disc 36 of the spider head and thus yieldingly urges the jaws 30 toward the smaller end of the tapering portion 26 of the casing.

In operation, it is apparent that when the wire 40 is forced into the open end of the casing the wire first engages the cam faces 35 of the jaws and retracts the jaws against the tension of the spring 27, the jaws sliding against the inner wall of the tapering portion 26 of the casing and gradually spreading until the wire is free of the cam faces 35 of the jaws. At this time the wire 40 is forced inwardly between the jaws and up into the space between the fingers or arms 38. As soon as the pressure on the wire 40 is released, the spring 27 urges the jaws 30 outwardly in the smaller end of the casing portion 26 and contracts the jaws about the wire 40, the teeth 34 of the jaws taken into the outer surface of the wire so that outward pull upon the wire only increases the wedging action of the jaws 30 about the wire which holds the latter firmer in place.

The function of the resilient spider head is to permit the jaws to independently advance into wedging position and to move radially, circumferentially or into a tilting position depending upon irregularities not only in the inner wall of the tapering section 26 in the casing but also in the outer surface of the wire or cable engaged.

Referring now to Figures 7 to 12, the modification relates to the jaws 30ª only. In this instance each jaw 30ª is stamped from sheet metal and is of the general tapering form of the jaw 30 and at its inner or larger end is provided with an upwardly struck rivet or stud 33ª adapted to engage through the opening 39 of an adjacent finger or arm 38 of the spider head, shown in Figures 6 and 12. At spaced points throughout the length of the jaw 30ª, it is provided with outwardly pressed beads 31ª which are graduated in size as to diameter and width throughout the tapering body of the jaw, and the outer rounded surfaces of the beads 31ª provide spaced points of contact for engaging the inner wall of the tapering end 26 of the casing so that the jaw 30ª offers less resistance to longitudinal or sliding movement against the inner wall of the casing than is offered by the cylindrical bearing surface 31 of the jaw 30 in Figure 4.

As shown in Figure 11, the inner wall of the jaw 30ª is provided with teeth, threads, serrations or the like 34ª which may be relatively sharp and strong incident to the sheet metal construction of the jaw 30ª and also because the jaw 30ª may be made of a suitable alloy to obtain the necessary hardness without sacrificing the required resiliency of the jaw throughout its length or sections as compared with the forged structure of Figure 4. The jaw 30ª thus has spaced sections or portions for engaging the wire or cable 40 and these sections or portions are more or less individually wedged into engagement between the cable and the tapering portion 26 of the casing by the spaced apart beads 31ª which separate the wire engaging sections.

The jaws 30ª are secured to the spider head in the same manner as shown in Figures 1, 2 and 3 by means of the studs 33ª which provide rivets for holding the arms 38 against the outer sides of the jaws 30ª at their enlarged ends. Thus, the jaws 30ª cooperate with the improved spider head to provide a jaw unit which is strong in its gripping action upon the wire or cable and which admits of the flexing of the jaws not only as a whole but as to its individual sections to take care of irregularities in the surfaces of the wire and the casing and to thus insure a firm grip of all of the jaws throughout substantially their entire length upon the cable.

What is claimed is:

1. In a wire connector, the combination of a casing having a tapering open end to receive a wire, an expanding spring in the casing, a group of jaws slidably disposed in the tapering end of the casing to receive the wire therebetween, and a connecting head for the jaws disposed in the casing and normally urged by said spring toward the tapering end of the casing to slide and contract the jaws therein, said head comprising a disc portion having spring arms at its outer edge, one arm for each jaw secured thereto for holding the jaws on the head, said disc being radially slotted in line with the arms and the slots extending from the central portion of the disc into the mid-portions of the arms to provide spring sections interconnecting adjacent arms for flexibly supporting the jaws on the head.

2. In a wire connector, the combination of a casing having a tapering open end to receive a wire, an expanding spring in the casing, a group of jaws slidably disposed in the tapering end of the casing to receive the wire therebetween, and a connecting head for the jaws disposed in and the casing and normally urged by said spring toward the tapering end of the casing to slide and contract the jaws therein, said head comprising a disc portion having spring arms at its outer edge, one arm for each jaw secured thereto for holding the jaws on the head, said disc and arms having continuous slots therein extending from the central portion of the disc into the mid-portions of the arms for dividing the disc and the arms into interconnected spring portions admitting the easy independent flexing of the arms during the sliding and contraction of the jaws in the tapering end of the casing.

3. In a wire connector, a casing having a tapering open end, a spring in the casing, and a resilient jaw unit in the tapering end of the casing urged by said spring toward the opening thereof, said jaw unit comprising a flexible spider head having a disc and arms at the edge of the disc, said disc having intersecting radial slots extending lengthwise into the arms to divide the disc and arms into resilient connecting sections, and a jaw secured to the free end of each arm for interconnecting adjacent jaws by said resilient connecting sections, each jaw having spaced raised ribs proportioned in height to the angle of taper of said tapering end of the casing and having toothed sections between the ribs for contact with the wire, whereby said spring is adapted to wedge said jaws into the tapering end of the casing and said ribs are adapted to individually transmit pressure between the tapering end of the casing and the outer surface of the wire through said toothed sections.

4. In a wire connector, a casing having a tapering open end, a jaw unit in the casing, and a spring in the casing normally urging the jaw unit into said tapering end, said jaw unit comprising a spider head to receive the thrust of the spring and having connecting arms, and a jaw secured to each arm of the head, said jaw having a sheet metal tapering body stamped with transverse spaced apart raised ribs and intermediate internally toothed sections, said ribs adapted to wedge against the inner surface of said tapering end of the casing and individually transmit contracting pressure through the intermediate section to the surface of the wire and the sheet metal jaw body adapted to flex to compensate for inequalities in the inner wall of the tapering end of the casing and in the outer surface of the wire and maintain a substantially equal gripping pressure on the wire throughout the length of the jaws.

5. A resilient gripping jaw for wire connectors, comprising a tapering sheet metal body pressed to provide spaced apart transverse ribs consecutively reduced in height and width from end to end of the jaw body to correspond to the taper thereof, said sheet metal jaw body also having intermediate sections between the ribs with gripping teeth in their inner faces.

6. A jaw unit for wire connectors, comprising a spider head having arms and resilient connections between adjacent arms, and a jaw mounted on each arm, each jaw having a tapering sheet metal body pressed into spaced apart outstanding transverse ribs proportioned in size corresponding to the taper of the body and having intermediate sections between the ribs with wire gripping teeth on the inner faces of the sections.

WILLIAM H. BARLOW.